(12) United States Patent
Difrancesco et al.

(10) Patent No.: US 9,675,934 B2
(45) Date of Patent: Jun. 13, 2017

(54) HONEYCOMB CATALYTIC ASSEMBLIES AND APPLICATIONS THEREOF

(71) Applicant: CORMETECH, INC., Durham, NC (US)

(72) Inventors: Chris E. Difrancesco, Durham, NC (US); James C. Altizer, Wake Forest, NC (US)

(73) Assignee: Cormetech, Inc., Durham, NC (US)

( * ) Notice: Subject to any disclaimer, the term of this patent is extended or adjusted under 35 U.S.C. 154(b) by 324 days.

(21) Appl. No.: 14/417,423

(22) PCT Filed: Jul. 25, 2013

(86) PCT No.: PCT/US2013/052076
§ 371 (c)(1),
(2) Date: Jan. 26, 2015

(87) PCT Pub. No.: WO2014/018762
PCT Pub. Date: Jan. 30, 2014

(65) Prior Publication Data
US 2015/0209726 A1    Jul. 30, 2015

Related U.S. Application Data

(60) Provisional application No. 61/676,165, filed on Jul. 26, 2012.

(51) Int. Cl.
*B01D 53/86* (2006.01)
*B01J 35/04* (2006.01)
*B01D 46/24* (2006.01)

(52) U.S. Cl.
CPC ..... *B01D 53/8631* (2013.01); *B01D 53/8628* (2013.01); *B01J 35/04* (2013.01);
(Continued)

(58) Field of Classification Search
None
See application file for complete search history.

(56) References Cited

U.S. PATENT DOCUMENTS

| 4,595,662 A | 6/1986 | Mochida et al. |
| 2004/0097370 A1 | 5/2004 | Ichikawa et al. |

FOREIGN PATENT DOCUMENTS

| DE | 4341159 A1 * | 6/1995 | ......... B01D 53/9431 |
| EP | 2609980 A1 | 7/2013 | |

OTHER PUBLICATIONS

Kleuderlein, R. DE4341159A1—translated document (1995).*
(Continued)

*Primary Examiner* — Walter D Griffin
*Assistant Examiner* — Jelitza Perez
(74) *Attorney, Agent, or Firm* — J. Clinton Wimbish; Smith Moore Leatherwood LLP

(57) ABSTRACT

In one aspect, catalytic assemblies are described herein. A catalytic assembly, in some embodiments, comprises a plurality of honeycomb catalyst segments bonded to one another by a bonding material, the honeycomb catalyst segments comprising an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent an inorganic oxide composition and at least 0.1 weight percent a catalytically active metal functional group.

19 Claims, 6 Drawing Sheets

(52) U.S. Cl.
CPC ...... *B01D 46/2444* (2013.01); *B01D 46/2466* (2013.01); *B01D 2255/20723* (2013.01); *B01D 2255/20769* (2013.01); *B01D 2255/20776* (2013.01)

(56) References Cited

OTHER PUBLICATIONS

Notification Concerning Transmittal of International Preliminary Report on Patentability for corresponding PCT Application No. PCT/US2013/052076, mailed Feb. 5, 2015, 9 pages.
International Search Report and Written Opinion mailed Jan. 7, 2014 for PCT/US2013/052076, 12 pages.

* cited by examiner

HONEYCOMB CATALYTIC ASSEMBLIES AND APPLICATIONS THEREOF

RELATED APPLICATION DATA

The present application is a national stage application under 35 U.S.C. §371 of International Application No. PCT/US2013/052076, filed Jul. 25, 2013, which claims priority pursuant to 35 U.S.C. §119(e) to U.S. Provisional Patent Application Ser. No. 61/676,165 filed Jul. 26, 2012 which are hereby incorporated by reference in their entireties.

FIELD

The present invention relates to honeycomb catalyst assemblies and, in particular, to bonded honeycomb catalyst assemblies.

BACKGROUND

The high toxicity of nitrogen oxides and their role in the formation of acid rain and tropospheric ozone have resulted in the imposition of strict standards limiting the discharges of these chemical species. To meet these standards, it is generally necessary to remove at least part of these oxides present in the exhaust gases from stationary or mobile combustion sources.

Denitration or selective catalytic reduction (SCR) technology is commonly applied to combustion-derived gases for removal of nitrogen oxides. Denitration comprises the reaction of nitrogen oxide species in the gases, such as nitric oxide (NO) or nitrogen dioxide ($NO_2$), with a nitrogen containing reductant, such as ammonia or urea, resulting in the production of nitrogen gas ($N_2$) and water.

SCR catalytic reactors generally comprise honeycomb structural catalyst bodies containing fluid flow paths that enable contact between flue gas streams and catalytically active components of the honeycomb bodies. The structure of a modular catalytic reactor is typically composed of one or more catalytic layers with each layer comprising a large number of modularized sections. Each modularized section further comprises a metal support framework which holds an assembly of honeycomb catalyst bodies in place wherein non-bonding, compressible packing materials between the catalyst bodies are used for proper flow distribution of fluid streams passing through the catalyst bodies.

Honeycomb SCR catalyst bodies are often provided a square or rectangular cross-sectional profile to facilitate assembly and packing within square or rectangular modularized sections. Such cross-sectional geometry can preclude application of honeycomb SCR catalyst bodies in a variety of fields.

SUMMARY

In one aspect, catalytic assemblies of varying geometries are provided herein. The catalytic assemblies, in some embodiments, are operable for the selective catalytic reduction of nitrogen oxide in a flue gas or exhaust gas stream.

A catalytic assembly, in some embodiments, comprises a plurality of honeycomb catalyst segments bonded to one another by a bonding material, the honeycomb catalyst segments comprising an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent an inorganic oxide composition and at least 0.1 weight percent a catalytically active metal functional group. The catalytically active metal functional group, in some embodiments, is operable for the selective catalytic reduction of nitrogen oxides. Moreover, in some embodiments, the bonding material comprises ceramic cement.

In another aspect, methods of making catalytic assemblies are described herein. A method of making a catalytic assembly, in some embodiments, comprises providing a plurality of honeycomb catalyst segments and bonding the honeycomb catalyst segments to one another with a bonding material to provide a bonded structure, wherein the honeycomb catalyst segments comprise an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent an inorganic oxide composition and at least 0.1 weight percent a catalytically active metal functional group. The bonded structure of honeycomb catalyst segments, in some embodiments, is mechanically worked into the desired shape or geometry.

In some embodiments, the catalytically active metal functional group of a catalyst segment is operable for the selective catalytic reduction of nitrogen oxides. The bonding material, in some embodiments, comprises ceramic cement.

In another aspect, methods of treating an exhaust or flue gas stream are described herein. A method of treating an exhaust or flue gas stream, in some embodiments, comprises providing a catalytic assembly, passing the stream through the catalytic assembly and catalytically reducing nitrogen oxides in the stream, wherein the catalytic assembly comprises a plurality of honeycomb catalyst segments bonded to one another by a bonding material, the honeycomb catalyst segments comprising an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent an inorganic oxide composition and at least 0.1 weight percent a catalytically active metal functional group for the catalytic reduction of nitrogen oxides.

These and other embodiments are described in greater detail in the detailed description which follows.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Catalytic Assembly

In one aspect, catalytic assemblies are described herein. A catalytic assembly, in some embodiments, comprises a plurality of honeycomb catalyst segments bonded to one another by a bonding material, the honeycomb catalyst segments comprising an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent an inorganic oxide composition and at least 0.1 weight percent a catalytically active metal functional group.

Figure 1:
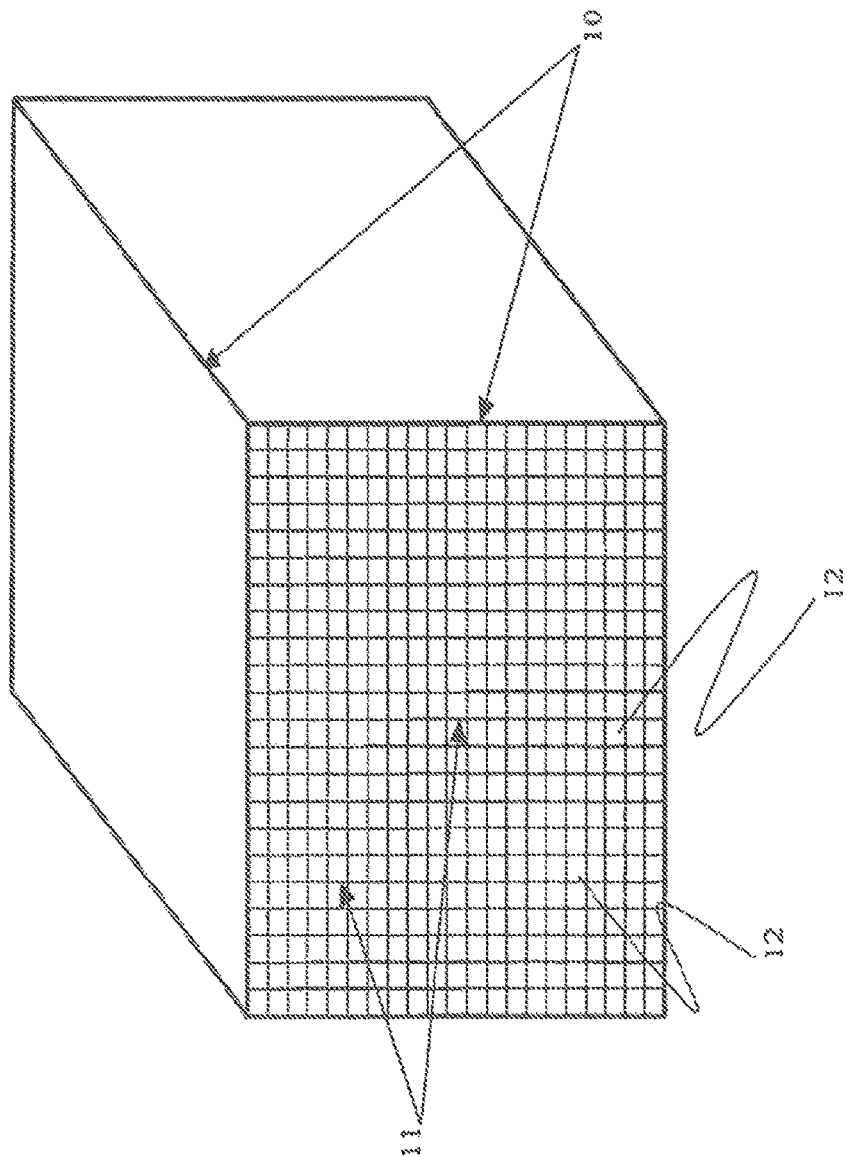
FIG. 1 illustrates a perspective view of an individual honeycomb catalyst segment of a catalytic assembly according to one embodiment described herein.

FIG. 1 illustrates a perspective view of an individual honeycomb catalyst segment of a catalytic assembly according to one embodiment described herein. The honeycomb catalyst segment of FIG. 1 displays a catalytically active outer peripheral wall (10) and a plurality of catalytically active inner partition walls (11) within the outer peripheral wall (10). The inner partition walls (11) define a plurality of flow channels or cells (12) which extend longitudinally through the honeycomb catalyst segment. When incorporated into a catalytic assembly described herein, the honeycomb catalyst segment of FIG. 1 is bonded to one or more like honeycomb catalyst segments along side(s) of the outer peripheral wall (10) by a bonding material, such that the flow channels of the bonded honeycomb catalyst segments are parallel or substantially parallel to one another in the axial direction.

As described herein, the inner partition walls and outer peripheral wall of honeycomb catalyst segments of catalytic assemblies are formed of a chemical composition comprising 50-99.9 weight percent an inorganic oxide composition and at least 0.1 weight percent a catalytically active metal functional group. In some embodiments, the chemical composition is uniform or substantially uniform. Alternatively, in some embodiments, the chemical composition of the inner partition walls and outer peripheral wall is heterogeneous.

In being formed of the chemical composition, the inner partition walls and outer peripheral wall have dispersed throughout 50-99.9 weight percent an inorganic oxide composition and at least 0.1 weight percent a catalytically active metal functional group. In some embodiments, the chemical composition comprises 70-98 weight percent the inorganic oxide composition. The inorganic oxide composition includes, but is not limited to, titania ($TiO_2$), alumina ($Al_2O_3$) or zirconia ($ZrO_2$), or mixtures thereof. In some embodiments, for example, the chemical composition comprises titania in an amount of 80-98 weight percent. In some embodiments, the inorganic oxide of the chemical composition is solely titania. In some embodiments, titania of the inorganic oxide composition comprises silica-stabilized titania. Suitable silica-stabilized titania can include compositions described in United States Patent Application Publication 2011/027154, which is incorporated herein by reference in its entirety.

A catalytically active metal functional group is a metal or metal compound operable for participating in one or more catalytic reactions. In some embodiments, the catalytically active metal functional group is present in the chemical composition in an amount ranging from about 1-30 weight percent or from about 5-25 weight percent. The catalytically active metal functional group, in some embodiments, is operable for the selective catalytic reduction of nitrogen oxides. In some embodiments, for example, the catalytically active metal functional group includes, but is not limited to, vanadium oxide, tungsten oxide, molybdenum oxide, ruthenium, ruthenium oxide, ruthenium compound or mixtures thereof. Vanadium oxide, tungsten oxide, molybdenum oxide, ruthenium and/or ruthenium compound(s) can be present in the chemical composition according to any of the values provided in Table I.

TABLE I

Amounts of Catalytically Active Metal Functional Group (weight percent)

| Vanadium oxide | Tungsten oxide | Molybdenum oxide | Ru or Ru compound |
|---|---|---|---|
| 0.1-10 | 0.1-20 | 0.1-20 | 0.01-5 |
| 0.1-7 | 0.1-15 | 0.1-15 | 0.01-0.2 |
| 0.1-6 | 0.5-10 | 0.5-10 | 0.1-3 |
| 1-5 | 1-5 | 1-5 | 0.6-0.9 |

Further, a honeycomb catalyst segment of a catalytic assembly can be substantially free of catalytic poison(s). In some embodiments, the chemical composition comprises less than 0.06 weight percent poison(s) for the catalytically active metal functional group. For example, in embodiments wherein the catalytically active metal functional group is for the reduction of $NO_x$, the chemical composition can contain less than 0.06 weight percent of sodium, calcium and potassium.

A honeycomb catalyst segment comprising inner partition walls and an outer peripheral wall, in some embodiments, is formed from extruding the chemical composition comprising the inorganic oxide composition and catalytically active metal functional group. Alternatively, in some embodiments, a honeycomb catalyst segment is formed from extruding the inorganic oxide composition without the catalytically active metal functional group. The catalytically active metal functional group is subsequently dispersed throughout the inner partition walls and outer peripheral wall by impregnation. In some embodiments, a honeycomb catalyst segment is impregnated with catalytically active metal functional group prior to bonding with other honeycomb catalyst segments into a catalytic assembly. In some embodiments, the bonded catalytic assembly is subjected to an impregnation process to provide catalytically active metal functional group throughout the outer peripheral wall and inner partition walls of the honeycomb catalyst segments.

In some embodiments, the inner partition walls formed of the catalytically active chemical composition can demonstrate an average thickness of less than or equal to 0.26 mm or less than or equal to 0.22 mm. The inner partition walls, in some embodiments, have an average thickness ranging from 0.05 mm to 0.26 mm. In some embodiments, the inner partition walls have an average thickness ranging from 0.05 mm to 0.22 mm or from 0.10 mm to 0.18 mm. Alternatively, the inner partition walls can have an average thickness greater than or equal to 0.22 mm. The inner partition walls, for example, can have an average thickness ranging from 0.1 mm to 1 mm. In some embodiments, the inner partition walls have an average thickness ranging from 0.23 mm to 1 mm or from 0.25 mm to 1 mm. Additionally, the inner partition walls can have an average thickness ranging from 0.30 mm to 1 mm. Moreover, the outer peripheral wall formed of the catalytically active chemical composition can have an average thickness of at least the average thickness of the inner partition walls.

As described herein, the inner partition walls define a plurality of flow channels or cells which extend longitudinally through the honeycomb catalyst segment. A honeycomb catalyst segment can demonstrate a cell density ranging from about 50 cells per square inch (cpsi) to about 600 cpsi. In some embodiments, a honeycomb catalyst segment demonstrates a cell density ranging from about 100 cpsi to about 350 cpsi or from about 450 cpsi to 600 cpsi. For example, in some embodiments, a honeycomb catalyst segment has 86 cpsi, 140 cpsi, 200 cpsi or 325 cpsi.

A honeycomb catalyst segment of a catalytic assembly, in some embodiments, has a porosity ranging from about 30% to about 70%. The honeycomb catalyst segment can have a macroporosity of greater than or equal to 0.01 cc/g in pores of diameter ranging from 600-5,000 Angstroms. In some embodiments, the honeycomb catalyst segment has a macroporosity of greater than or equal to 0.05 cc/g in pores of diameter ranging from 600-5,000 Angstroms.

A honeycomb catalyst segment of a catalytic assembly can have any desired size not inconsistent with the objectives of the present invention. In some embodiments, a honeycomb catalyst segment has cross-sectional dimensions of at least 3 inches×3 inches. A honeycomb catalyst segment, in some embodiments, has cross-sectional dimensions of at least 5 inches×5 inches or at least 7 inches×7 inches. In some embodiments, a honeycomb catalyst segment has cross-sectional dimensions ranging from 3 inches×3 inches to 7 inches×7 inches. A honeycomb catalyst segment, in some embodiments, has a length or axial dimension ranging from about 50 mm to about 800 mm. In some embodiments, a honeycomb catalyst segment has a length or axial dimension less than about 50 mm or greater than about 800 mm. In some embodiments, a honeycomb catalyst segment has an axial dimension or length of at least about 150 mm or at least about 300 mm. A honeycomb catalyst segment, in some embodiments, has a length ranging from about 250 mm to about 1 m.

A honeycomb catalyst segment of a catalytic assembly can have a coefficient of thermal expansion (CTE) in the range of $4 \times 10^{-6}/°$ C. to $8 \times 10^{-6}/°$ C. In some embodiments, a honeycomb catalyst segment has a CTE of $5 \times 10^{-6}/°$ C. to $6 \times 10^{-6}/°$ C.

Further, a honeycomb catalyst segment of a catalytic assembly can have an areal catalyst weight density ranging from about 200 g/m$^2$ to about 800 g/m$^2$. In some embodiments, the areal catalyst weight density ranges from about 200 g/m$^2$ to about 625 g/m$^2$. The areal catalyst weight density is equal to the mass of the monolithic structural catalyst body per unit geometric surface area. The areal catalyst weight density or mass per unit geometric surface area may be computed directly as the mass of the monolithic structural catalyst body divided by the geometric surface area of the monolithic structural catalyst body. The geometric surface area is equal to the perimeter of the flow channels times the length of the flow channels multiplied by the number of flow channels contained within the structural catalyst body.

Additionally, a honeycomb catalyst segment of a catalytic assembly can have a macroporosity greater than or equal to 0.01 cc/g in pores of diameter ranging from 600 to 5,000 Angstroms. In some embodiments, the macroporosity of a segment can be greater than or equal to 0.05 cc/g in pores of diameter ranging from 600 to 5,000 Angstroms.

A honeycomb catalyst segment of a catalytic assembly can have an open frontal area (OFA) according to any of the values provided in Table II.

TABLE II

| Open Frontal Area of Honeycomb Catalyst Segment Open Frontal Area (%) |
| --- |
| ≥65 |
| ≥70 |
| ≥75 |
| ≥79 |
| ≥80 |
| ≥81 |
| ≥82 |
| 75-90 |
| 79-85 |

OFA of a honeycomb catalyst segment is equal to the total area of all the cells across the entire cross-section of the honeycomb segment divided by the cross-sectional area of the honeycomb segment. In the case of square cells or flow channels and a square overall cross-sectional geometry for the honeycomb catalyst segment, OFA may be determined according to Equation (1):

$$\text{OFA} = [(\text{cell size})^2 \cdot (\text{number of cells in cross-section of segment})]/(\text{total cross-sectional area of segment}) \quad (1)$$

In this case of square cells or flow channels and square overall cross-sectional geometry, the total cross-sectional area of the honeycomb catalyst segment is equal to the square of the hydraulic diameter of the honeycomb segment.

In some embodiments, the ratio of OFA of the catalytic assembly comprising the bonded honeycomb catalyst segments to OFA of an individual honeycomb catalyst segment of the assembly [(OFA catalytic assembly)/(OFA honeycomb catalyst segment of the assembly)] is at least 0.8. OFA of the catalytic assembly can be determined in a manner consistent with that of an individual honeycomb catalyst segment, wherein peripheral wall thicknesses of the honeycomb segments and bonding material across the cross-section of the catalytic assembly are accounted for. In some embodiments, for example, OFA of a catalytic assembly ranges from 60-80%.

Figure 2:
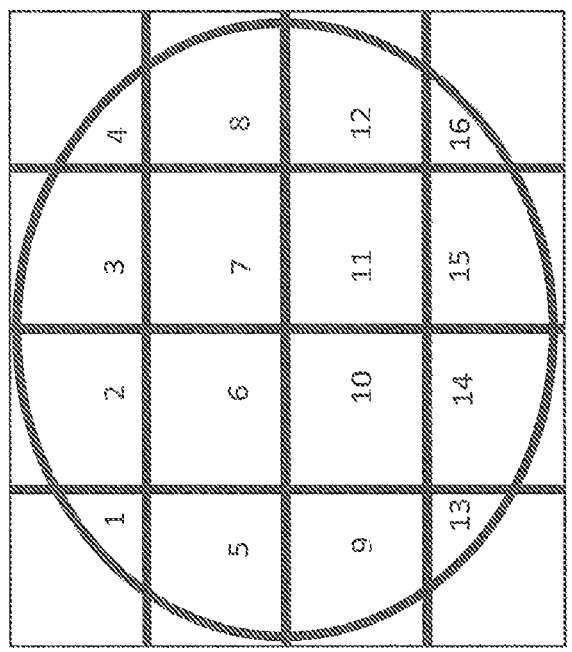
FIG. 2 is a schematic of a round catalytic assembly for determining open frontal area of the catalytic assembly according to one embodiment described herein.

The following is a sample OFA calculation for a circular catalytic assembly having the following dimensions and illustrated in the schematic of FIG. 2 according to one embodiment described herein. Numbers in the schematic of FIG. 2 represent individual honeycomb catalyst segments.

Catalytic Assembly Dimensions
Diameter—24 inches (609.6 mm)
Cement Thickness—3 mm
Log OD—151.5 mm
Catalyst Segment Open Area (140 cpsi) at 150×150 mm=79%

$$\text{Total Area} = \pi r^2 = 3.14159 \ast (609.6/2)^2 = 291863.26 \text{ mm}^2$$

$$\text{Total Area (minus skin)} = \pi r^2 = 3.14159 \ast (606.6/2)^2 = 288997.66 \text{ mm}^2$$

$$\text{Skin Area} = \text{Total Area} - \text{Total Area (minus skin)} = 291863.26 - 288997.66 = 2865.6 \text{ mm}^2$$

Square Cement Area (Total box)=3*609.6*3+
3*600.6*3=10891.8 mm²

Corner Cement Area (Outside Circle)=
8*49.5*3=1188 mm²

Top/Bottom/Sides Cement Area (Outside Circle)=
4*5.7*3=68.4 mm²

Cement Area=Square Cement Area Total−Cement
Area outside circle=10891.8−1188−68.4=9635.4
mm²

Honeycomb Area (140 cpsi)=Total Area−Skin Area−
Cement Area=279362.26 m²

Open Area=Honeycomb Area/Total Area*140 cpsi
Open Area=0.9571*0.79=0.756=75.6%

With the OFA catalytic assembly in the sample calculation being 75.6% and the OFA honeycomb catalyst segment being 79%, the ratio of OFA catalytic assembly to OFA honeycomb catalyst segment is 0.96.

The ratio of OFA of the catalytic assembly comprising the bonded honeycomb catalyst segments to OFA of an individual honeycomb catalyst segment of the assembly can have a value according to Table III.

TABLE III

OFA Ratio of Catalytic Assembly to Honeycomb Catalyst Segment
Open Frontal Area Ratio

| |
|---|
| ≥0.8 |
| ≥0.85 |
| ≥0.9 |
| ≥0.91 |
| ≥0.92 |
| ≥0.93 |
| ≥0.94 |
| ≥0.95 |
| 0.9-0.99 |
| 0.91-0.98 |
| 0.92-0.97 |
| 0.93-0.96 |
| 0.9-0.97 |

In some embodiments, honeycomb catalyst segments suitable for use in catalytic assemblies described herein are detailed in U.S. Pat. Nos. 7,776,786; 7,807,110 and 8,137,633 each of which is incorporated herein by reference in its entirety.

As described herein, honeycomb catalyst segments of a catalytic assembly are bonded to one another by a bonding material. Any suitable bonding material not inconsistent with the objectives of the present invention can be used to bond honeycomb catalyst segments. The bonding material, in some embodiments, is ceramic cement. Ceramic cement, in some embodiments, comprises inorganic particles, inorganic oxide fiber and colloidal oxide.

Inorganic particles, in some embodiments, comprise a transition metal oxide, a transition metal nitride, a transition metal carbide, silicon carbide, silicon nitride, cordierite, alumina, mullite, zirconia, zirconium phosphate or aluminum titanate or mixtures thereof. The inorganic particles, in some embodiments, have an average size ranging from about 1 μm to about 200 μm. In some embodiments, the inorganic particles have an average particle size ranging from about 10 μm to about 100 μm or from about 15 μm to about 50 μm. Moreover, in some embodiments, the inorganic particles demonstrate a bi-modal or multi-modal particle size distribution. In one embodiment, for example, the inorganic particles demonstrate a bimodal particle size distribution comprising a first average particle size ranging from about 5 μm to about 20 μm and a second average particle size ranging from about 40 μm to about 200 μm.

Inorganic particles can be present in the ceramic cement in any amount not inconsistent with the objectives of the present invention. In some embodiments, the inorganic particles are present in an amount of at least about 10 weight percent or at least about 15 weight percent. In some embodiments, the inorganic oxide particles are present in an amount ranging from about 5 weight percent to about 60 weight percent. The inorganic particles, in some embodiments, are present in an amount ranging from about 15 weight percent to about 50 weight percent.

The inorganic oxide fiber of the ceramic cement, in some embodiments, is an alkaline earth silicate fiber, alkaline earth aluminosilicate fiber or mixtures thereof. The alkaline earth metal of the inorganic fiber, in some embodiments, is selected from the group consisting of magnesium, calcium and mixtures thereof. Additionally, the inorganic oxide fiber, in some embodiments, comprises aluminosilicate, silica, alumina or mullite or mixtures thereof. The inorganic oxide fiber, in some embodiments, demonstrates an amorphous structure. For example, in some embodiments, any of the foregoing inorganic oxide fibers are amorphous. Alternatively, in some embodiments, the inorganic oxide fibers are crystalline or display crystalline domains in an amorphous matrix.

The inorganic oxide fibers can have any desired length not inconsistent with the objectives of the present invention. In some embodiments, the inorganic oxide fibers have an average length ranging from about 50 μm to about 1 mm. In some embodiments, the inorganic oxide fibers have an average length ranging from about 100 μm to about 900 μm or from about 200 μm to about 800 μm. The inorganic oxide fibers can also have an average length less than about 50 μm or greater than about 1 mm.

Inorganic oxide fibers can be present in the ceramic cement in any amount not inconsistent with the objectives of the present invention. In some embodiments, the inorganic oxide fibers are present in an amount of at least about 10 weight percent or at least about 15 weight percent. In some embodiments, the inorganic oxide fibers are present in an amount ranging from about 5 weight percent to about 60 weight percent. The inorganic oxide fibers, in some embodiments, are present in an amount ranging from about 15 weight percent to about 50 weight percent.

Colloidal oxide of the ceramic cement, in some embodiments, comprises a silica sol, alumina sol or mixtures thereof. In some embodiments, the colloidal silica is amorphous. The colloidal oxide can be present in the ceramic cement in any amount not inconsistent with the objectives of the present invention. In some embodiments, the colloidal oxide is present in an amount ranging from about 5 weight percent to about 40 weight percent. The colloidal oxide, in some embodiments, is present in an amount ranging from about 5 weight percent to about 35 weight percent.

Further, the ceramic cement can have a CTE substantially matched to the CTE of the honeycomb catalyst segments. Alternatively, CTEs of the ceramic cement and the honeycomb catalyst segments are mismatched. In some embodiments, CTE of the ceramic cement is less than the CTE of a honeycomb catalyst segment. In other embodiments, CTE of the ceramic cement is greater than the CTE of a honeycomb catalyst segment.

In some embodiments of a catalytic assembly described herein, ceramic cement between adjacent honeycomb segments has a thickness ranging from about 0.1 mm to about 5 mm. In some embodiments, ceramic cement between adjacent honeycomb catalyst segments has a thickness ranging from about 0.5 mm to about 3 mm or from about 1-2 mm.

Additionally, in some embodiments of a catalytic assembly described herein, at least one bonded honeycomb catalyst segment comprises a migration region extending into the catalyst segment from an interface with the ceramic cement a distance ranging from about 1 mm to about 50 mm, the migration region comprising one or more species of the ceramic cement. In some embodiments, the migration region extends into the catalyst segment a distance ranging from about 5 mm to about 35 mm. Moreover, in some embodiments, a species of the ceramic cement in the migration region is silica. The silica can derive from the colloidal oxide of the ceramic cement.

Figure 3:
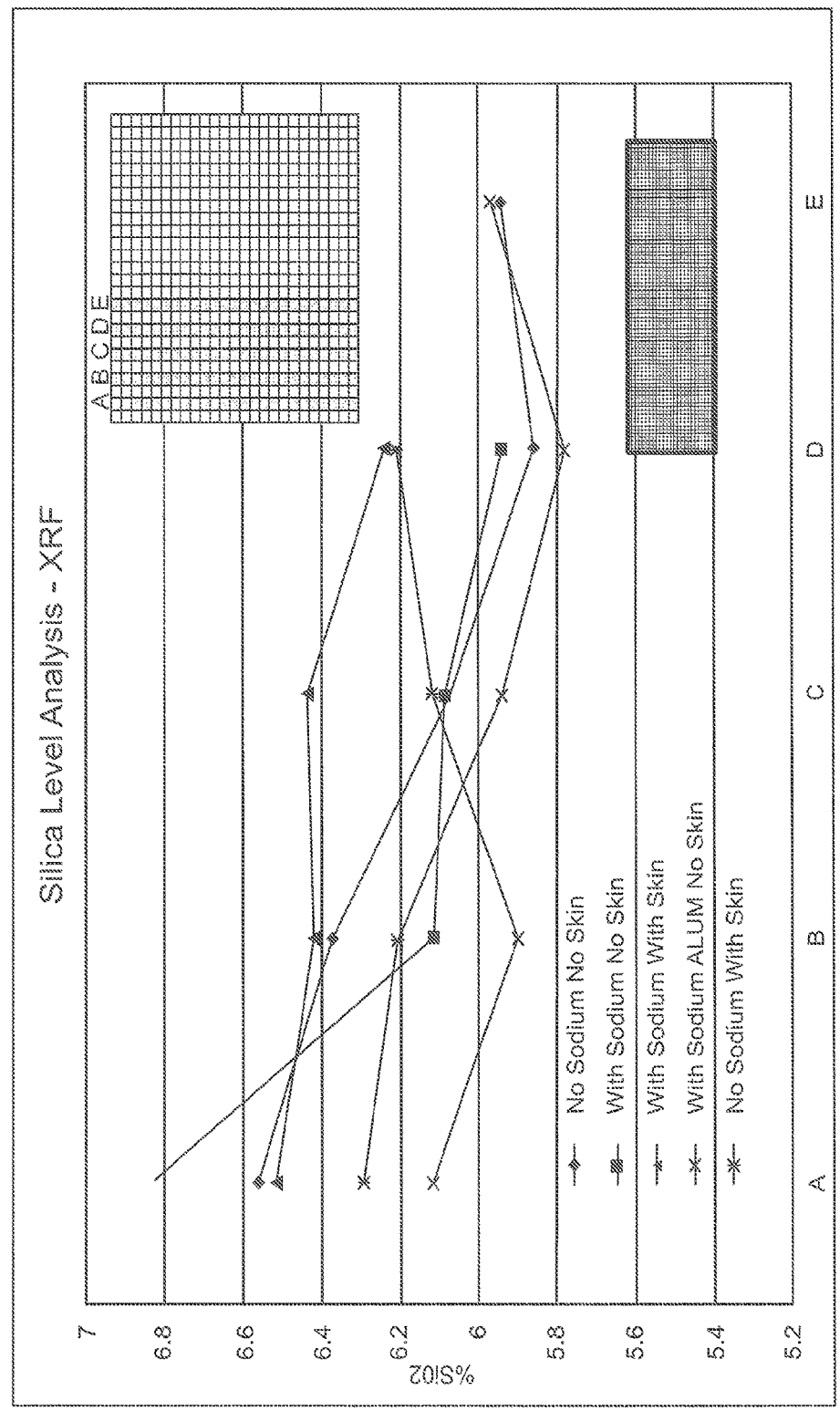
FIG. 3 illustrates silica content of ceramic cement in a migration region of a bonded honeycomb catalyst segment of a catalytic assembly according to one embodiment described herein.

FIG. 3 illustrates silica content of the ceramic cement in a migration region of a bonded honeycomb catalyst segment of a catalytic assembly according to one embodiment described herein. As illustrated in FIG. 3, silica of the ceramic cement migrated into the honeycomb catalyst segment a distance of up to 10 cells or about 25 mm. Silica content in the migration region was determined by X-ray fluorescence (XRF).

The migration region, in some embodiments, further comprises migrated catalytically active metal functional group of the chemical composition forming the outer peripheral wall and inner partition walls of a bonded honeycomb catalyst segment. Migration of catalytically active metal functional group can establish a catalytic material diminution region in the catalyst segment at the interface with the ceramic cement. For example, migration of catalytic material from the outer peripheral wall and inner partition walls proximate the interface with the ceramic cement into interior regions of the catalyst segment can establish the diminution region. The migration region can include migrated vanadium oxide, tungsten oxide and/or molybdenum oxide establishing the diminution region at the catalyst segment-cement interface. In some embodiments, for example, vanadium can migrate a distance of up to 10 cells or 25 mm toward the interior of the catalyst segment, thereby establishing a diminution region at the interface. Catalytic material migration can be determined by XRF or other suitable analytical technique.

Further, the distance of the migration region can be modulated by changing the amount of ceramic cement in contact with a honeycomb catalyst segment. For example, in some embodiments, distance of a migration region is increased with increasing amounts of ceramic cement.

A catalytic assembly comprising bonded catalyst segments further comprises an outer coating or skin. The outer coating surrounds the axial dimension of the peripheral honeycomb catalyst segments of the catalytic assembly. The outer coating can have any thickness not inconsistent with the objectives of the present invention. In some embodiments, the outer coating has a thickness ranging from about 0.1 mm to about 10 mm. The outer coating, in some embodiments, has a thickness ranging from about 0.5 mm to about 5 mm. In some embodiments, the outer coating has a thickness ranging from about 1 mm to about 10 mm or from about 1 mm to about 5 mm. The outer coating can comprise any material not inconsistent with the objectives of the present invention. In some embodiments, the outer coating comprises ceramic cement described herein.

A catalytic assembly comprising bonded honeycomb catalyst segments can have any desired shape. In some embodiments, a catalytic assembly has a circular or elliptical cross-sectional geometry. In some embodiments, a catalytic assembly has a polygonal cross-sectional geometry. For example, in some embodiments, a catalytic assembly has a triangular, square, rectangular, hexagonal or octagonal cross-sectional geometry. In some embodiments wherein the catalytic assembly has a circular cross-sectional geometry, the assembly has a diameter of according to any value of Table IV.

TABLE IV

| Diameter of Circular Catalytic Assembly (inches) |
| --- |
| ≥7.5 |
| ≥8 |
| ≥12 |
| ≥20 |
| ≥24 |
| ≥30 |
| ≥36 |
| 7.5-36 |
| 8-30 |
| 12-24 |
| 12-36 |

In some embodiments, the diameter of a catalytic assembly comprising bonded honeycomb catalyst segments varies less than 4 mm along the fixed longitudinal axis or length of the assembly with respect to a set diameter value for the assembly. In one embodiment, for example, the specification of a catalytic assembly described herein has a set diameter value of (x) inches. The diameter of the catalytic assembly produced in accordance with the specification varies less than 4 mm from the set diameter value of (x) inches along the fixed longitudinal axis or length of the assembly. In other words, the diameter of the catalytic assembly along the fixed longitudinal axis or length of the assembly varies less than 4 mm from the set specification value of (x) inches. The set specification can be the average diameter of the assembly. In some embodiments, the diameter of the catalytic assembly varies less than 3 mm or less than 2 mm along the fixed longitudinal axis of the assembly with respect to a set diameter value for the assembly. The diameter of the of the catalytic assembly, in some embodiments, varies less than 1 mm along the fixed longitudinal axis of the assembly with respect to a set diameter value for the assembly. Further, the diameter of the catalytic assembly varies from about 0.25 mm to about 4 mm along the fixed longitudinal axis of the assembly with respect to a set diameter value for the assembly. In some embodiments, the catalytic assembly demonstrates the foregoing diameter tolerances in the as-formed state. In being in the as-formed state, the catalytic assembly has not been machined to achieve the desired diameter tolerance. Alternatively, the catalytic assembly, in some embodiments, is machined to achieve the set diameter tolerance.

In some embodiments, (x) is at least 12. In some embodiments, (x) is at least 13, 18, 20 or 24. A catalytic assembly demonstrating any of the foregoing diameter tolerances can have an axial dimension or length of at least 150 mm, at least 200 mm or at least 250 mm. In some embodiments, a catalytic assembly demonstrating any of the foregoing diameter tolerances has an axial dimension or length of at least 300 mm, at least 450 mm or at least 600 mm.

Additionally, in some embodiments, a catalytic assembly comprising a plurality of bonded honeycomb catalyst segments has an isostatic strength of at least about 3 Kg/cm$^2$. In some embodiments, a catalytic assembly has an isostatic strength of at least about 5 Kg/cm$^2$ or at least about 10

Kg/cm². The isostatic strength of a catalytic assembly, in some embodiments, ranges from about 3 Kg/cm² to about 25 Kg/cm². In some embodiments, isostatic strength of a catalytic assembly can be determined from the measured transverse compressive strength of the catalytic assembly according to Equation 2:

$$\text{Isostatic Strength} = (\text{transverse compressive strength}) \cdot (1.38) \quad (2)$$

as detailed in Gulati et al., *Isostatic Strength of Extruded Cordierite Ceramic Substrates*, 2004-01-1135, Corning Incorporated. Alternatively, in some embodiments, isostatic strength can be directly measured according to FIG. 1(*a*) of the foregoing Corning paper.

Transverse compressive strength can be measured with a compressive testing apparatus such as Tinius Olson 60,000 lb. Super "L" Compression Testing Machine that displays a maximum compression load of 30,000 kg and can be obtained from Tinius Olsen of Willow Grove, Pa. The compressive load can be applied as provided in Table V in a direction normal to the direction of fluid flow in the flow channels of the assembly.

TABLE V

Compressive Loads

| Full Scale Load | Compression Speed |
|---|---|
| 3,000 Kg | 25 Kg/s |
| 6,000 Kg | 50 Kg/s |
| 15,000 Kg | 125 Kg/s |

The maximum transverse compressive load W (Kg) withstood by a sample is registered by the apparatus. The transverse compressive strength is subsequently calculated from the maximum compressive load in kilograms-force ($kg_f$) by dividing the value of the maximum compressive load by the surface area over which the load was applied.

In some embodiments where the catalyst body does not lie flat, such as when the catalytic assembly has an overall circular or oval cross-sectional geometry, a subsection of the catalytic assembly is cut from the overall sample for testing. The subsection is cut so as to produce a sample with upper and lower flat surfaces. The remainder of the strength testing proceeds in a manner consistent with that previously described.

Figure 4:
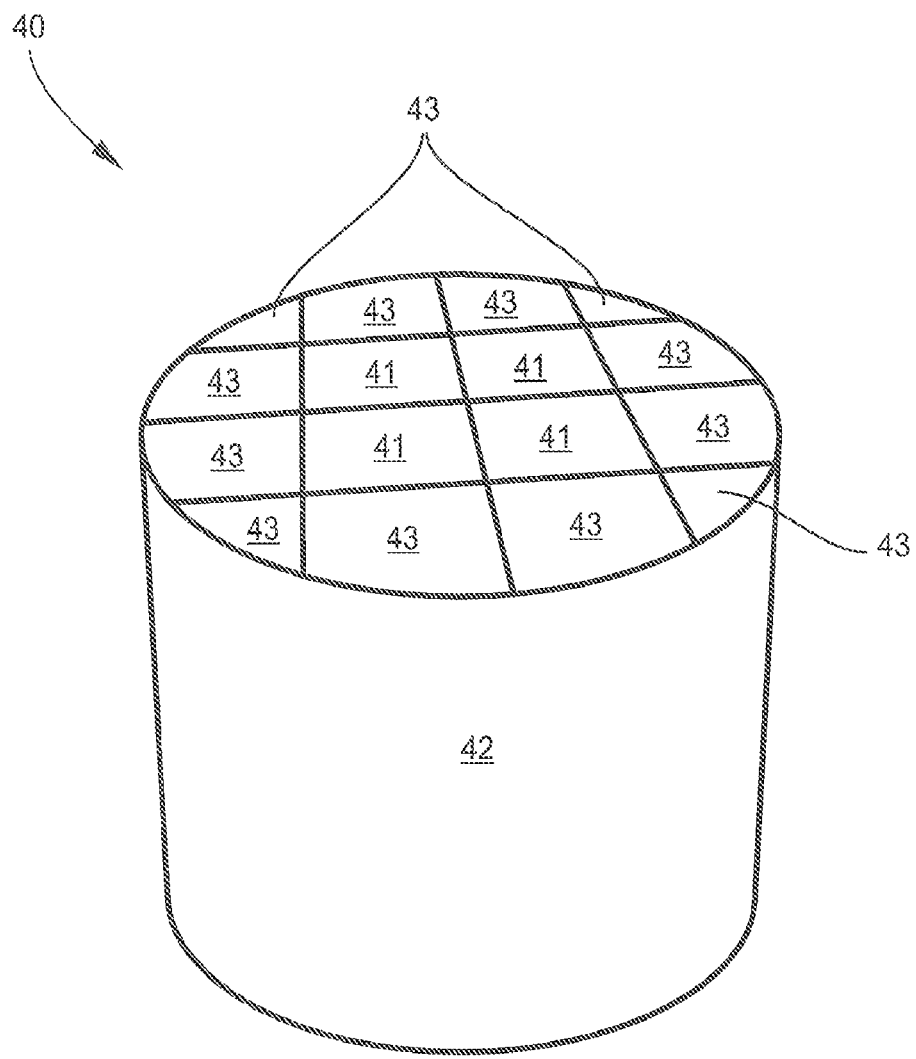
FIG. 4 illustrates a perspective view of a catalytic assembly according to one embodiment described herein.

FIG. 4 illustrates a perspective view of a catalytic assembly comprising bonded honeycomb catalyst segments according to one embodiment described herein. As illustrated in FIG. 4, the catalytic assembly (40) of bonded honeycomb catalyst segments (41, 43) is cylindrical. The peripheral honeycomb catalyst segments (43) are surrounded by an outer coating (42).

Figure 5:
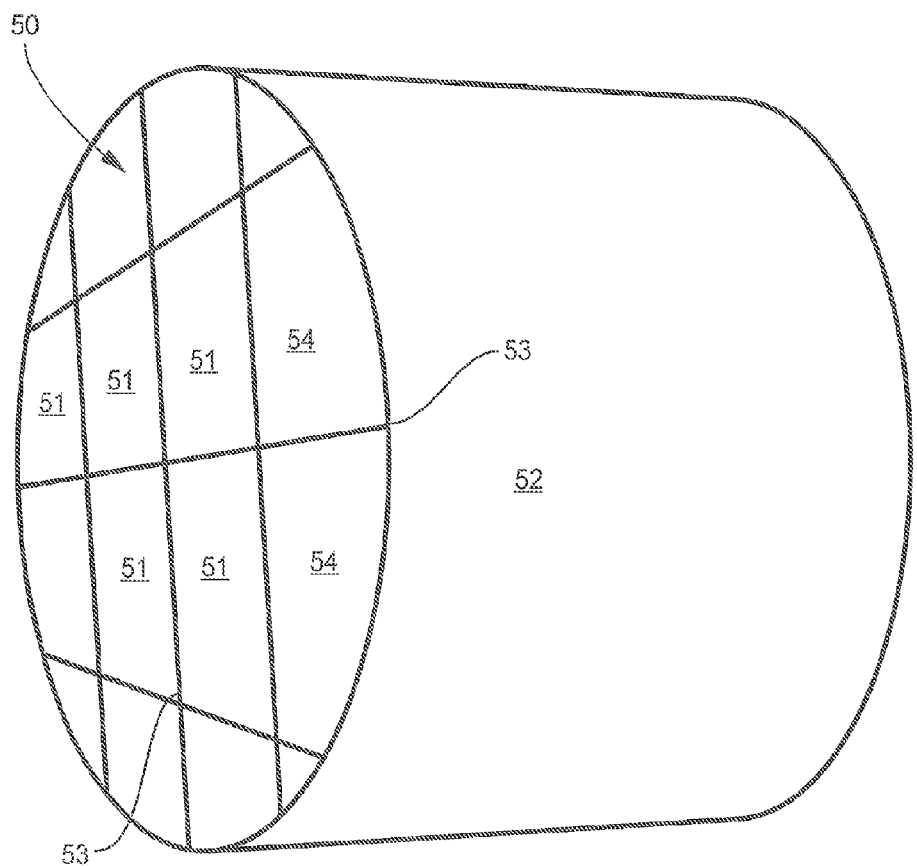
FIG. 5 illustrates a perspective view of a catalytic assembly according to one embodiment described herein.

Similarly, FIG. 5 illustrates a perspective view of a catalytic assembly comprising bonded honeycomb catalyst segments according to one embodiment described herein. As illustrated in FIG. 5, the catalytic assembly (50) of bonded honeycomb catalyst segments (51, 54) is cylindrical. The peripheral honeycomb catalyst segments (54) are surrounded by an outer coating (52). Bonding material comprising ceramic cement (53) is evident between the honeycomb catalyst segments (51, 54).

A peripheral honeycomb catalyst segment can have a ratio of weight of the catalytic assembly to bonded surface area of the peripheral honeycomb catalyst segment of 0.02-0.1 Kg/cm², wherein the catalytic assembly is operable to remain suspended for a time period of 60 seconds when raised by an apparatus coupled solely to the peripheral honeycomb catalyst segment, wherein the catalytic assembly has been thermally cycled 500 times from 150° C. to 500° C. to 150° C. prior to raising.

Bonded surface area of a peripheral honeycomb catalyst segment can be determined by summing surface areas of sides of the catalyst segment participating in bonding arrangements. For example, peripheral honeycomb catalyst segment (4) in FIG. 2 has two sides participating in a bonding arrangement. Summing the surface area of each side participating in bonding provides the bonded surface area of peripheral honeycomb catalyst segment (4). The total weight of the catalytic assembly is divided by the value for the bonded surface area of the peripheral catalyst segment to provide a value in the range of 0.02-0.25 Kg/cm². In some embodiments, the ratio of weight of the catalytic assembly to bonded surface area of the peripheral honeycomb catalyst segment is in a range selected from Table VI.

TABLE VI

Ratio of total wt. of catalytic assembly to bonded surface area of peripheral honeycomb catalyst segment (Kg/cm²)

| |
|---|
| 0.02-0.25 |
| 0.02-0.2 |
| 0.02-0.15 |
| 0,02-0.1 |
| 0.03-0.08 |

Thermal cycling of the catalytic assembly can be administered by positioning the catalytic assembly in ductwork of a furnace and flowing a flue gas stream through the honeycomb catalyst segments forming the catalytic assembly. Suitable furnace equipment is commercially available from Jensen Industries of Fenton, Mich. For example, a suitable furnace from Jensen Industries is a 1202° F. Max Gas Fired High Temperature Furnace. The flue gas stream flowed through the honeycomb catalyst segments forming the catalytic assembly has an average temperature ramping of 3.8-4.0° C./s from a start temperature of 150° C. to an end hold temperature of 525° C. with a room temperature face velocity of about 3 m/s. Further, the heated gas stream is held at 525° C. for a time period of 15-20 minutes prior to cool down to 150° C. The catalytic assembly is cooled to 150° C. at an average rate of 0.4-0.6° C./s. Cooling can be administered by extinguishing the furnace burner and recirculating the flue gas stream mixed with ambient air through the honeycomb catalyst segments forming the assembly. The pilot of the furnace can remain lit during the cooling procedure. When the catalytic assembly reaches 150° C., it is held at 150° C. for a time period of 5-10 minutes before beginning the next thermal cycle.

Subsequent to undergoing 500 thermal cycles, the catalytic assembly is subjected to a one-point raise test. In the test, an apparatus for raising the catalytic assembly is coupled to a single peripheral honeycomb catalytic segment, and the catalytic assembly is raised for a time period of 60 seconds. The catalytic assembly passes the raise test if the assembly remains suspended in the apparatus for the 60 seconds. Raising the entire catalytic assembly by a single peripheral honeycomb catalyst segment places maximum stress on the peripheral segment, thereby exposing any failure mechanisms precipitated by cracks and/or other structural defects induced by thermal cycling. For example, the apparatus can be attached to peripheral honeycomb catalyst segment (4) of FIG. 2, and the catalytic assembly raised to a suspended/unsupported state, such as raising into the air. If the bond of the peripheral catalyst segment is structurally compromised due to thermal cycling, part or all of peripheral honeycomb catalyst segment (4) will separate from the catalytic assembly causing the assembly to fall out of the apparatus and to the floor.

Figure 6:
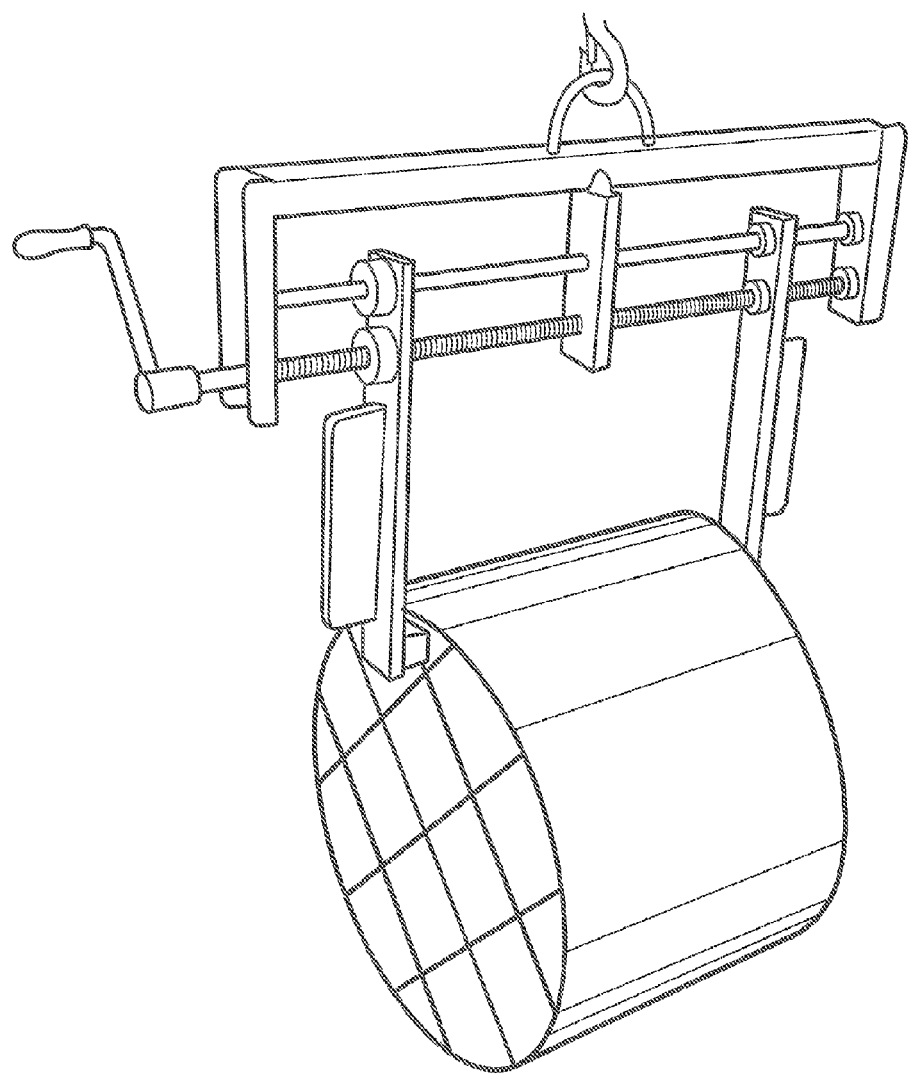
FIG. 6 illustrates a perspective view of a thermally cycled catalytic assembly undergoing a single point raise test according to one embodiment described herein.

FIG. 6 illustrates a round catalytic assembly undergoing a one-point raise test according to one embodiment described herein. As illustrated in FIG. 6, end faces of peripheral honeycomb catalyst segment (4) are clamped into an apparatus for raising the catalytic assembly. The catalytic assembly is then raised and suspended for a time period of 60 seconds.

II. Methods of Making a Catalytic Assembly

In another aspect, methods of making catalytic assemblies are described herein. A method of making a catalytic assembly, in some embodiments, comprises providing a plurality of honeycomb catalyst segments and bonding the honeycomb catalyst segments to one another with a bonding material to provide a bonded structure, wherein the honeycomb catalyst segments comprise an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent an inorganic oxide composition and at least 0.1 weight percent a catalytically active metal functional group. The honeycomb catalyst segments can have any composition and/or properties described in Section I hereinabove.

As described hereinabove, the honeycomb catalyst segments can contain catalytically active metal functional group prior to bonding to form the catalytic assembly. In some embodiments, for example, honeycomb catalyst segments are extruded from a chemical composition of Section I comprising catalytically active metal functional group. Moreover, honeycomb catalyst segments can be impregnated with catalytically active metal functional group prior to bonding into the catalytic assembly.

Alternatively, the honeycomb catalyst segments do not contain catalytically active metal functional group prior to bonding into the catalytic assembly. In such embodiments, catalytically active metal functional group can be imparted to the honeycomb segments by subjecting to the catalytic assembly to impregnation processing.

In some embodiments, the bonding material for use in methods described herein comprises ceramic cement. The ceramic cement can have any composition and/or properties described in Section I hereinabove.

Methods of making a catalytic assembly, in some embodiments, further comprise mechanically working the bonded structure into the desired shape. In some embodiments, the bonded structure is mechanically worked to have circular or elliptical cross-sectional profile. Alternatively, the bonded structure, in some embodiments, is mechanically worked to have a polygonal cross-sectional profile such as triangular, hexagonal or octagonal. In some embodiments, mechanical working comprises milling and/or lathing the catalytic assembly.

An outer coating, in some embodiments, is applied to the bonded structure. The outer coating can have any composition and/or properties described in Section I hereinabove. In some embodiments, the catalytic assembly is mechanically worked prior to application of the outer coating. Further, in some embodiments, the catalytic assembly is mechanically worked subsequent to application of the outer coating.

The catalytic assembly, in some embodiments, is positioned in a container. In some embodiments, a container is a metal sleeve.

Catalyst assemblies produced according to methods described herein can have any of the properties recited in Section I hereinabove, including OFA, shape and diameter.

III. Methods of Treating an Exhaust or Flue Gas Stream

In another aspect, methods of treating an exhaust or flue gas stream are described herein. A method of treating an exhaust or flue gas stream, in some embodiments, comprises providing a catalytic assembly, passing the stream through the catalytic assembly and catalytically reducing nitrogen oxides in the stream, wherein the catalytic assembly comprises a plurality of honeycomb catalyst segments bonded to one another by a bonding material, the honeycomb catalyst segments comprising an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent an inorganic oxide composition and at least 0.1 weight percent a catalytically active metal functional group for the catalytic reduction of nitrogen oxides.

The honeycomb catalyst segments and catalytic assembly can have any composition and/or properties described in Section I hereinabove. Further, in some embodiments, the bonding material for use in methods described herein comprises ceramic cement. The ceramic cement can have any composition and/or properties described in Section I hereinabove.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A catalytic assembly comprising:
a plurality of honeycomb catalyst segments bonded to one another by a ceramic cement, the honeycomb catalyst segments having a coefficient of thermal expansion (CTE) of $4\times10^{-6}/°$ C. to $8\times10^{-6}/°$ C. and comprising an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent titania and at least 0.1 weight percent a catalytically active metal functional group; and
an outer coating surrounding axial dimensions of bonded honeycomb catalyst segments at the periphery of the catalytic assembly, wherein a peripheral honeycomb catalyst segment has a ratio of weight of the catalytic assembly to bonded area of the peripheral honeycomb catalyst segment of 0.02-0.25 Kg/cm$^2$, the catalytic assembly operable to remain suspended for a time period of 60 seconds when raised by an apparatus coupled solely to the peripheral honeycomb catalyst segment, wherein the catalytic assembly is raised subsequent to thermal cycling 500 times from 150° C. to 500° C. to 150° C., the catalytic assembly heated to 500° C. by flowing a flue gas stream through the honeycomb catalyst segments of the assembly, the flue gas stream increasing in average temperature at a rate of 3.8-4.0° C./s and cooling the catalytic assembly to 150° C. at an average rate of 0.4-0.6° C./s.

2. The catalytic assembly of claim 1, wherein the honeycomb catalyst segments have a CTE of $5 \times 10^{-6}/°$ C. to $6 \times 10^{-6}/°$ C.

3. The catalytic assembly of claim 1, wherein the catalytically active metal functional group is operable for the selective catalytic reduction of nitrogen oxides.

4. The catalytic assembly of claim 3, wherein the catalytically active metal functional group comprises tungsten oxide, molybdenum oxide or vanadium pentoxide or mixtures thereof.

5. The catalytic assembly of claim 1, wherein the ratio of weight of the catalytic assembly to bonded area of the peripheral honeycomb catalyst segment is 0.03-0.08 $Kg/cm^2$.

6. The catalytic assembly of claim 1, wherein a ratio of open frontal area of the catalytic assembly to open frontal area of a honeycomb catalyst segment of the assembly is at least 0.8.

7. The catalytic assembly of claim 6, wherein the ratio is at least 0.85.

8. The catalytic assembly of claim 6, wherein the ratio is at least 0.92.

9. The catalytic assembly of claim 1, wherein the ceramic cement comprises inorganic particles, inorganic oxide fiber and colloidal oxide.

10. The catalytic assembly of claim 1 having a substantially circular cross-section of diameter at least 16 inches.

11. The catalytic assembly of claim 10 having a diameter of at least 24 inches.

12. The catalytic assembly of claim 1, wherein the inner partition walls of at least one of the honeycomb catalyst segments have an average thickness less than or equal to 0.26 mm.

13. The catalytic assembly of claim 1 having an open frontal area of at least about 0.65.

14. The catalytic assembly of claim 1 having an open frontal area of at least about 0.73.

15. The catalytic assembly of claim 1, wherein the inner partition walls have an average thickness of less than or equal to 0.26 mm and the ratio of weight of the catalytic assembly to bonded area of the peripheral honeycomb catalyst segment is 0.03-0.08 $Kg/cm^2$, the catalytic assembly having a substantially circular cross-section of diameter at least 18 inches and an open frontal area of at least 0.73, wherein a ratio of the open frontal area of the catalytic assembly to open frontal area of a honeycomb catalyst segment of the assembly is at least 0.85.

16. The catalytic assembly of claim 15 having an isostatic strength of at least 5 $Kg/cm^2$.

17. A catalytic assembly comprising:
a plurality of honeycomb catalyst segments bonded to one another by a bonding material of a ceramic cement, the honeycomb catalyst segments comprising an outer peripheral wall and a plurality of inner partition walls defining flow channels extending longitudinally through the catalyst segments, wherein the outer peripheral wall and inner partition walls have dispersed throughout a chemical composition comprising 50-99.9 weight percent titania and at least 0.1 weight percent a catalytically active metal functional group, the inner partition walls having an average thickness less than or equal to 0.26 mm, wherein the catalytic assembly has a diameter of at least 16 inches, an isostatic strength of at least 5 $Kg/cm^2$ and a ratio of open frontal area of the assembly to open frontal area of a honeycomb catalyst segment of the assembly of at least 0.85.

18. The catalytic assembly of claim 17, wherein the inner partition walls have an average thickness of less than or equal to 0.22 mm.

19. The catalytic assembly of claim 17, wherein the catalytic assembly has a length of at least 150 mm.

* * * * *